(12) United States Patent
Yan et al.

(10) Patent No.: US 12,033,256 B2
(45) Date of Patent: Jul. 9, 2024

(54) MAP DATA PROCESSING METHOD, ELECTRONIC DEVICE AND STORAGE MEDIUM

(71) Applicant: Beijing Baidu Netcom Science Technology Co., Ltd., Beijing (CN)

(72) Inventors: Kailong Yan, Beijing (CN); Juntao Tong, Beijing (CN); Changjun Sheng, Beijing (CN); Yingjie Niu, Beijing (CN)

(73) Assignee: BEIJING BAIDU NETCOM SCIENCE TECHNOLOGY CO., LTD, Beijing (CN)

( * ) Notice: Subject to any disclaimer, the term of this patent is extended or adjusted under 35 U.S.C. 154(b) by 80 days.

(21) Appl. No.: 17/851,484

(22) Filed: Jun. 28, 2022

(65) Prior Publication Data

US 2023/0186536 A1    Jun. 15, 2023

(30) Foreign Application Priority Data

Dec. 13, 2021    (CN) .......................... 202111520501.9

(51) Int. Cl.
*G06T 11/60*    (2006.01)
*G01C 21/00*    (2006.01)
*G06F 16/29*    (2019.01)

(52) U.S. Cl.
CPC .......... *G06T 11/60* (2013.01); *G01C 21/3878* (2020.08); *G06F 16/29* (2019.01)

(58) Field of Classification Search
CPC ..... G06T 11/60; G06T 11/00; G01C 21/3878; G01C 21/3885; G06F 16/29; G06F 16/23; G06F 16/27
See application file for complete search history.

(56) References Cited

U.S. PATENT DOCUMENTS

2015/0369617 A1*  12/2015  Ding ..................... G01C 21/34
                                                    701/428
2016/0349063 A1*  12/2016  Maurer ............. G01C 21/3697
2019/0005055 A1*   1/2019  Andrew ............. G06F 16/9537

FOREIGN PATENT DOCUMENTS

CN    101571403 A    11/2009
CN    103559009 A     2/2014
(Continued)

OTHER PUBLICATIONS

China National Intellectual Property Administration; Notification of the First Office Action; CN Application No. 202111520501.9; 10 pages; dated Jun. 10, 2023.

(Continued)

*Primary Examiner* — Jeffery A Brier
(74) *Attorney, Agent, or Firm* — Faegre Drinker Biddle & Reath LLP

(57) ABSTRACT

The present disclosure provides a map data processing method, an electronic device and a storage medium, relates to a technical field of data processing, and in particular to the field of map data processing. A specific implementation solution is as follows: receiving first data encapsulated in a form of offline data, the first data being used to characterize low-frequency data in the map data; obtaining second data after initiating a first online request, the second data being used to characterize high-frequency data in the map data; and performing merging processing on the first data and the second data to obtain target data to be displayed in a map. By adopting the present disclosure, the timeliness of map data display may be improved.

16 Claims, 9 Drawing Sheets

(56) References Cited

FOREIGN PATENT DOCUMENTS

| CN | 106463056 | A |   | 2/2017 |            |
|----|-----------|---|---|--------|------------|
| CN | 107609080 | A |   | 1/2018 |            |
| CN | 107806883 | A | * | 3/2018 | G01C 21/3446 |
| CN | 108509239 | A |   | 9/2018 |            |
| CN | 109509254 | A |   | 3/2019 |            |
| WO | 2023065731 | A1 |   | 4/2023 |            |

OTHER PUBLICATIONS

China National Intellectual Property Administration; Notification of the Second Office Action; CN Application No. 202111520501.9; 8 pages; dated Aug. 26, 2023.

* cited by examiner

MAP DATA PROCESSING METHOD, ELECTRONIC DEVICE AND STORAGE MEDIUM

CROSS-REFERENCE TO RELATED APPLICATIONS

The present application claims the priority from Chinese Patent Application No. 202111520501.9, filed with the Chinese Patent Office on Dec. 13, 2021, the content of which is hereby incorporated herein by reference in its entirety.

TECHNICAL FIELD

The present disclosure relates to a technical field of data processing, and in particular, to a field of map image data processing.

BACKGROUND

Users may browse cities using offline map data, which is not only convenient, but also saves traffic. However, the update frequency of offline map data is not high, resulting in poor timeliness for users to see the data.

SUMMARY

The present disclosure provides a map data processing method and apparatus, an electronic device and a storage medium.

According to one aspect of the present disclosure, provided is a map data processing method including: receiving first data encapsulated in a form of offline data, the first data being used to characterize low-frequency data in map data; obtaining second data after initiating a first online request, the second data being used to characterize high-frequency data in the map data; and performing merging processing on the first data and the second data to obtain target data to be displayed in a map.

According to another aspect of the present disclosure, provided is a map data processing method including: layering the map data, to obtain first data and second data; where the first data is used to characterize low-frequency data in the map data, and the second data is used to characterize high-frequency data in the map data; sending the first data encapsulated in a form of offline data; and sending the second data, in response to receiving a first online request.

According to another aspect of the present disclosure, provided is a map data processing apparatus including: a first receiving unit configured to receive first data encapsulated in a form of offline data, the first data being used to characterize low-frequency data in map data; a first sending unit configured to obtain second data after initiating a first online request, the second data being used to characterize high-frequency data in the map data; and a first merging processing unit configured to perform merging processing on the first data and the second data, to obtain target data to be displayed in the map.

According to another aspect of the present disclosure, provided is a map data processing apparatus including: a layering processing unit configured to layer the map data to obtain first data and second data; where the first data is used to characterize low-frequency data in the map data, and the second data is used to characterize high-frequency data in the map data; a second sending unit configured to send the first data encapsulated in a form of offline data; and a third receiving unit configured to receive a first online request and send the second data.

According to another aspect of the present disclosure, provided is an electronic device, including: at least one processor; and a memory connected in communication with the at least one processor, where, the memory stores instructions executable by the at least one processor, and the instructions are executed by the at least one processor to enable the at least one processor to execute any one of the methods provided by embodiments of the present disclosure.

According to another aspect of the present disclosure, provided is a non-transitory computer-readable storage medium storing computer instructions thereon, where the computer instructions are used to enable a computer to execute any one of the methods provided by embodiments of the present disclosure.

According to another aspect of the present disclosure, provided is a computer program product including a computer program, where the computer program implements any one of the methods provided by embodiments of the present disclosure when executed by the processor.

By adopting the present disclosure, the first data encapsulated in the form of offline data may be received, the first data being used to characterize the low-frequency data in the map data, the second data may be obtained after initiating a first online request, the second data being used to characterize the high-frequency data in the map data, and the first data and the second data are merged to obtain target data to be displayed in the map, thereby the timeliness of the map data display may be improved.

It should be understood that the content described in this part is not intended to identify crucial or important features of embodiments of the present disclosure, or to limit the scope of the present disclosure. Other features of the present disclosure will be easily understood from the following description.

BRIEF DESCRIPTION OF THE DRAWINGS

The accompanying drawings are used to better understand the present solution, and do not constitute a limitation to the present disclosure.

DETAILED DESCRIPTION

Figure 1:
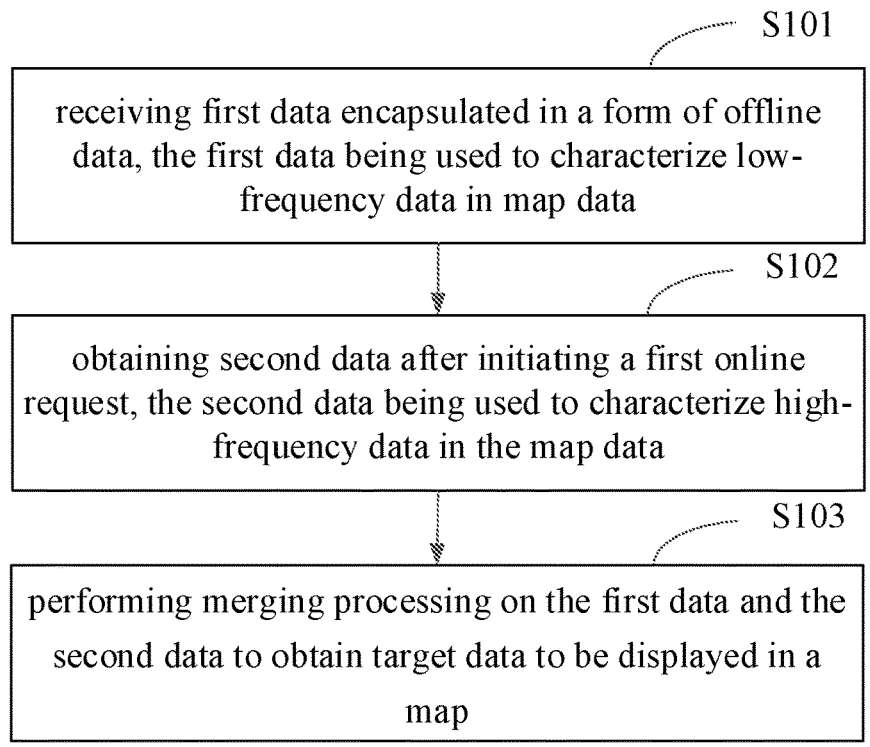
FIG. 1 is a schematic flowchart of a map data processing method according to embodiments of the present disclosure.

Exemplary embodiments of the present disclosure are described below with reference to the accompanying drawings, in which various details of embodiments of the present disclosure are included to facilitate understanding, and should be considered as merely exemplary. Therefore, various changes and modifications may be made to embodiments described herein by those having ordinary skill in the art without departing from the scope and spirit of the present disclosure. Likewise, for clarity and conciseness, descriptions of well-known functions and structures are omitted in the following description.

The term "and/or" herein is only used to describe an association relation of associated objects, indicating that there may be three kinds of relations of only A, both A and B, and only B. The term "at least one" herein means any combination of any one or at least two of associated listed items, for example, the expression "including at least one of A, B, and C" may mean including any one or more elements selected from the set of A, B, and C. The term "first", "second", etc. herein refer to a plurality of similar technical terms and are used to distinguish these terms without limitation to an order of these terms or to only two terms. For example, a first feature and a second feature refer to two kinds of features or/two features, the first feature may be one or more and the second feature may also be one or more.

In addition, in order to better illustrate the present disclosure, numerous specific details are given in the following detailed description. Those having ordinary skill in the art should understand that the present disclosure may be performed without certain specific details. In some instances, methods, means, elements and circuits well known to those skilled in the art are not described in detail in order to highlight the subject matter of the present disclosure.

Users may browse cities using offline map data, the offline map data may be an offline package containing map image data. Users may download the offline package through a map application (APP) (the offline package is a common function of map APP and a binary file for storing geographic information in the unit of city) in a case with network support, and then read the offline package stored locally in the terminal through the map APP without network, to display the electronic map. In other words, the offline package may be used directly to browse the whole city without consuming traffic, thereby saving traffic.

Although the offline package ensures that users may read map data at any time, an update frequency of the offline package is not high. Generally, the size of the offline package of single city is tens of MB or hundreds of MB, users only download the offline package in a WiFi environment by default, and thus the offline package of single city need to take up to one week to complete the update without users deliberately operate, resulting in poor timeliness of map data. For example, when a new subway line is opened or important roads (such as new expressways, national roads, and provincial roads) are opened, users may not obtain the updated latest geographic information elements in time, such as background surfaces, roads, building blocks, indoor map of buildings, point-of-interest (POI) points, subway lines, subway stations and other elements in the map, and although users may use the offline package conveniently and save traffic, the required map data update may be not obtained at the first time.

In the related art, the following solutions may be adopted to solve the problem of poor timeliness of map data due to low offline package update.

(1) Increasing the update frequency of the offline package and prompting users to update the offline package in a pop-up window. The conventional update frequency of the offline package is monthly, the present solution changes the update frequency to weekly or semi-weekly by increasing the update frequency of offline package, and the users are forced to be reminded of the need to update offline package by popping up a window on the map APP side. The existing problem is that since the update frequency of the offline package is too fast, the number of visits to an offline package download service remains high, and cost is great. At the same time, it also needs to rely on cooperation of users to perform the update operation on the map APP side, and it may be not guaranteed that all users may see the latest geographic information elements.

(2) The offline package is partially removed Users access the online image service through the map APP to obtain the latest geographic information elements in a case with an available network, and uses the data display in the offline package in a state of no network/weak network. The existing problem is that although users have downloaded the offline package, they still mainly access online image services in conventional use. However, the amount of image data of single city is large, that all user access online services in the networked state will lead to a sharp increase in the user's traffic cost. At the same time, in the case of weak network/no network, there will be large changes in the online data/offline package data, resulting in inaccurate image data, particularly for users in a weak network, the damage is great.

(3) The offline package is completely removed, and all users access the online image service in real time through the map APP to obtain the latest geographic information elements. The problem is that users may not view the map APP at all under weak network/no network conditions.

By analyzing the above problems, a preferred solution is that in order to obtain map data updates and geographic information elements, the updates need to be displayed in the offline package of the map APP in real time.

A map data processing method is provided according to embodiments of the present disclosure, and FIG. 1 is a schematic flowchart of a map data processing method according to embodiments of the present disclosure. The method may be applied to a map data processing apparatus, for example, the apparatus may be deployed in the case of execution by a terminal or server or other processing device, and may implement data encapsulation, data transmission/reception, data merging, and the like. The terminal may be user equipment (UE), mobile equipment, personal digital assistant (PDA), handheld equipment, computing equipment, on-board equipment, wearable equipment, etc. In some possible implementations, the method may also be performed by the processor invoking computer-readable instructions stored in the memory. As illustrated in FIG. 1, the method is applied to terminal equipment and includes the followings.

In S101, receiving first data encapsulated in a form of offline data, the first data being used to characterize the low-frequency data in the map data.

In S102, obtaining second data after initiating a first online request, the second data being used to characterize the high-frequency data in the map data.

In S103, performing merging processing on the first data and the second data to obtain target data to be displayed in the map.

In an example of S101 to S103, an offline package (the offline package is the first data encapsulated in the form of offline data) may be received, the client of the terminal equipment (such as a map APP) may initiate the above-mentioned first online request, a background server responds to the first online request and sends the above-mentioned second data (the data delivered in real time after the background server responds to the first online request) to the map APP, and the terminal equipment performs the merging processing on the first data and the second data through the map APP to obtain the latest map data and display the latest map data on the map. In an example, the first data is used to characterize the low-frequency data in the map data, and the low-frequency data may be various geographic information elements that need to be displayed on the map, such as data of buildings, parks, landmark buildings, national roads, provincial roads, high/expressway and the like updated at a low frequency. The second data is used to characterize the high-frequency data in the map data, and the high-frequency data may also be various geographic information elements that need to be displayed on the map, such as the data of points of interest with icons appearing on the map updated at a high frequency.

In the related art, users may only see the map data with low update frequency through the pre-downloaded offline package, and there is no high frequency data and low frequency data divided the present disclosure. By adopting embodiments of the present disclosure, the timeliness of map data display may be improved by integrating the high-frequency data and the low-frequency data. In other words, all map data may be divided into the above-mentioned low-frequency data and the above-mentioned high-frequency data on the background server, the low-frequency data may be combined with the offline package (i.e., the low-frequency data may be placed in the offline package), and the high-frequency data is sent online (i.e., the background server receives the client of the terminal equipment, such as the above-mentioned first online request initiated by the map APP, and responds to the first online request to send the high-frequency data to the map APP). Finally, the high frequency data and low frequency data are merged in the terminal equipment through the map APP to obtain the latest map data and display the latest map data on the map. Since the high-frequency data has high timeliness and is integrated with the low-frequency data being in the form of offline package, the obtained map data has high timeliness, thereby solving the problem that the update frequency of offline map data is not high, which leads to poor timeliness for users to see the map data. Therefore, it is not only convenient and saves traffic, but also the latest map data is displayed in real time in the offline package of the map APP, so that users may obtain the required map data updates at the first time.

In one exemplary implementation, the above-mentioned first data includes non-POI data, such as data of buildings, parks, landmark buildings, national roads, provincial roads, highways/expressways, and the like. The above-mentioned second data includes POI data, such as POI data with icons on the map. In an example, the types of POI data may include residential places, leisure places, entertainment facilities, parks, tourist service facilities, and the like. By adopting the present implementation, different data types may be distinguished, and thus the map data may be updated according to the timeliness of different data types.

In one exemplary implementation, performing the merging processing on the first data and the second data to obtain the target data displayed in the map includes: reading, from the first data, first geographic information element pertaining to a first layer; reading, from the second data, second geographic information element pertaining to the first layer; performing merging processing on the first geographic information element and the second geographic information element in the first layer; and continuing to perform the merging processing on the geographic information elements belonging to the same layer in the first data and the second data, until data of each layer is merged, to obtain the target data to be displayed in the map. In an example, the first geographic information element pertaining to the first layer in the first data may be basic data, and the second geographic information element pertaining to the first layer in the second data may be rich data. By adopting the present implementation, starting from the first layer, the above-mentioned merging processing is performed on the geographic information elements belonging to the same layer for all layers, and thus the basic data and the rich data may be combined to implement the update to obtain highly timeliness map data.

In one exemplary implementation, the method further includes: initiating a second online request, in response to an emergency intervention event (taking basic data as an example, the above-mentioned first online request is the merging processing of the map data in the ideal case that basic data is not updated, compared with the first online request, if the above-mentioned basic data is updated, for example, the opening of a new subway line requires emergency intervention, the second online request is the merging processing of the map data in the case of emergency intervention), and receiving the requested updated first data, the updated first data being indicated by a replacement identifier (such as, the replacement identifier may be that replace=1). By adopting the present implementation, for example, in the case of emergency intervention, the above-mentioned basic data may be replaced in the corresponding layer, i.e., the basic data in the previously downloaded offline package and the basic data updated by the background server may be distinguished by the replacement identifier, and the basic data in the offline package will be replaced with the updated basic data delivered in response to the second online request carrying the replacement identifier. Since the basic data of the corresponding layer is replaced only by the replacement identifier, the workload of data processing is small, and the efficiency is high, so that the users may be informed of the map data update in case of emergency intervention at the first time.

In one exemplary implementation, performing the merging processing on the first data and the second data to obtain the target data to be displayed in the map includes: reading, from the updated first data, a third geographic information element pertaining to a corresponding target layer, replacing a first geographic information element pertaining to the corresponding target layer in the first data with the third geographic information element, reading, from the second data, a fourth geographic information element pertaining to the target layer, and performing merging processing on the third geographic information element and the fourth geographic information element in the target layer to obtain the target data to be displayed in the map. By adopting the present implementation, the corresponding layer to be replaced is termed as the above-mentioned target layer, the third geographic information element includes the above-mentioned replacement identifier, and the third geographic information element (such as the updated basic data) is used to replace the first geographic information element (basic data in the offline package) in the corresponding target layer. As a result, the workload of data processing is small, and the efficiency is high, so that the users may be informed of the map data update in case of emergency intervention at the first time.

Figure 2:
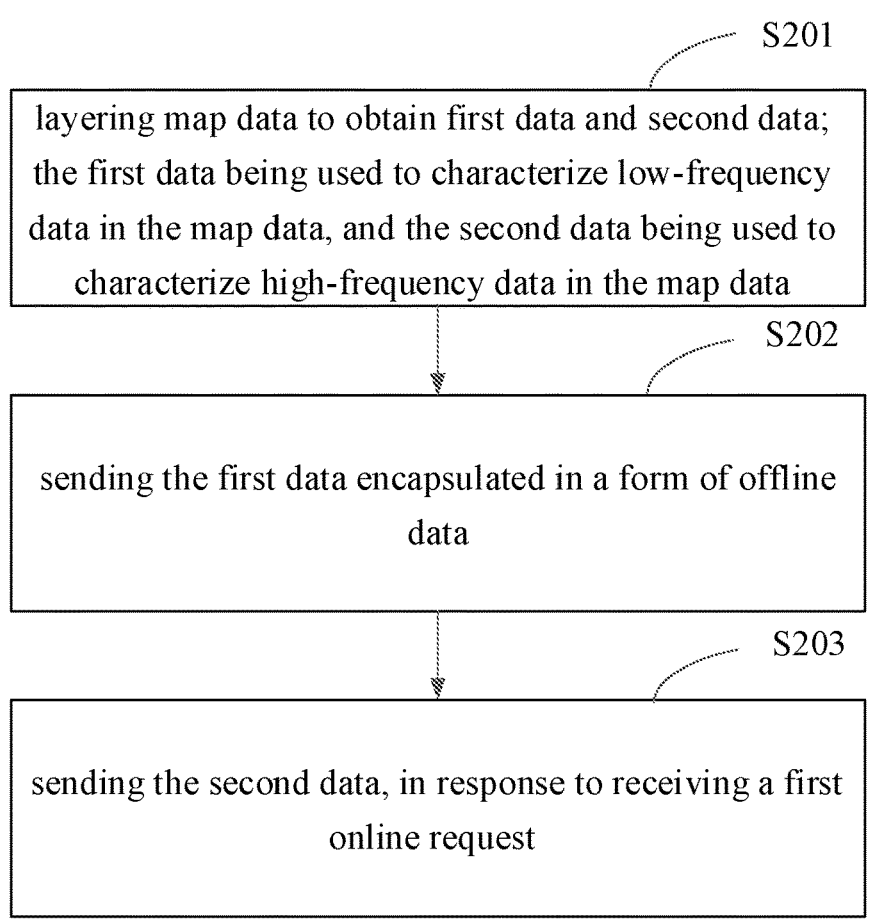
FIG. 2 is a schematic flowchart of a map data processing method according to embodiments of the present disclosure.

A map data processing method is provided according to embodiments of the present disclosure. FIG. 2 is a schematic flowchart of a map data processing method according to embodiments of the present disclosure, and the method is applied to the background server and includes the followings.

In S201, layering the map data to obtain first data and second data. In an example, the first data is used to characterize the low-frequency data in the map data; and the second data is used to characterize the high-frequency data in the map data.

In S202, sending the first data encapsulated in a form of offline data.

In S203, sending the second data, in response to receiving a first online request.

In an example of S201 to S203, the map data is layered to obtain the first data (the first data may be data in the offline package) and the second data (the second data may be data delivered in real time after the background server in response to the first online request), the data in the offline package is sent (i.e., the terminal equipment may download data from the background server under the condition of network, and then use the downloaded data offline), and the second data is sent. By adopting embodiments of the present disclosure, the terminal equipment may download data from the background server under the condition of network, and then use the downloaded data offline. Considering the timeliness of the map data, the map data needs to be updated in real time, and the background server may respond to a first online request to deliver the second data in real time. Finally, the terminal equipment merges the first data and the second data through the map APP to obtain the latest map data and display the latest map data on the map. Since the second data has high timeliness, the obtained map data has high timeliness by integrating with the first data, thereby solving the problem of poor timeliness in the data viewed by users due to the low update frequency of offline map data. Therefore, it is not only convenient and saves traffic, but also the latest map data is displayed in real time in the offline package of the map APP, so that users may obtain the required map data updates at the first time.

In one exemplary implementation, layering the map data to obtain the first data and the second data includes: layering the map data based on an update frequency of different geographic information elements and/or importance of the different geographic information elements according to a layering model, to obtain the first data and the second data. By adopting the present implementation, a trained layering model (the trained layering model is obtained by training a model after performing feature extraction on the training data) may be used to layer the map data based on the update frequency of the different geographic information elements and/or the importance of the different geographic information elements, thereby distinguishing the first data and the second data. In an example, the first data is used to characterize the low-frequency data in the map data, and the low-frequency data, may be various geographic information elements that need to be displayed on the map, such as data of buildings, parks, landmark buildings, national roads, provincial roads, high/expressway and the like updated at a low frequency. The second data is used to characterize the high-frequency data in the map data, and the high-frequency data may also be various geographic information elements that need to be displayed on the map, such as the data of points of interest with icons appearing on the map updated at a high frequency. Through the layering processing, the low-frequency data and the high-frequency data may be distinguished, the map data may be updated according to the timeliness of different data types, and thus the latest map data may be displayed in the offline package of the map APP in real time, so that the users may obtain the required map data updates at the first time.

In one exemplary implementation, a data source of the training data includes a plurality of data sources with a different confidence level, for example, different confidence levels may be graded according to the reliability of the data sources, the plurality of data includes 1) high-precision data, i.e., self-collected data through map APP, the high-precision data has the highest confidence and is a more reliable data source; 2) VIP data, i.e., the data source provided by a third party that has a cooperative relationship with the map APP, and the VIP data has the next highest confidence; and 3) common data, i.e., data sources that are not necessarily reliable, and the common data has the lowest confidence. By adopting the present implementation, the layering model is based on the data source of training data, the data source have a plurality of data sources with different confidence levels, and thus the layering model may be better trained through the training data, so that the accuracy of layering processing may be improved to obtain more accurate low-frequency data and high-frequency data.

In one exemplary implementation, the method further includes predicting and evaluating a layering processing capability of the layering model through the test data, to obtain an effect feedback file, and modifying the training data according to the effect feedback file. By adopting the present implementation, after the layering model has been trained, the training effect of the layering model may be suggested through the test data. Therefore, the layering processing capability of the layering model may be predicted and evaluated through the test data, the obtained effect feedback file may be used to modify the above-mentioned training data for the layering model, and the modified training data may be used to better train the layering model, thereby improving the accuracy of layering processing, to obtain more accurate low-frequency data and high-frequency data.

In one exemplary implementation, the method further includes: layering the map data based on a drawing attribute of different geographic information elements and/or a drawing order of the different geographic information elements. By adopting the present implementation, for example, in the map, a green space is generally under a road and is alternatively above a background surface of the map, which is a drawing order, and the drawing attributes may be the same layer. In other words, the layering processing may be performed first based on the same drawing attributes (i.e., being divided based on layers), and the layering processing is then performed based on the drawing order, that is, the drawing order is sequential, for example, roads are drawn on the map background, buildings are drawn on the roads, and so on. Considering various situations of drawing attributes and/or drawing orders comprehensively, on the basis of layering processing performed by the above-mentioned layering model, the layering processing may be further continued based on the drawing attributes of the different geographic information elements and/or the drawing order of the different geographic information elements, thereby further improving the accuracy of layering processing, to obtain more accurate low-frequency data and high-frequency data.

In one exemplary implementation, the method further includes: receiving a second online request, in response to initiating an emergency intervention event, and sending a requested updated first data, the updated first data being indicated by a replacement identifier. By adopting the present implementation, for example, in the case of emergency intervention, basic data (the basic data may be geographic information elements in the first data) may be replaced in the corresponding layer, and the background server receives the second online request and sends the updated basic data carrying the replacement identifier to the terminal equipment, where the basic data in the previously downloaded offline package and the basic data updated by the background server may be distinguished by the replacement identifier. Therefore, the basic data in the offline package will be replaced with the updated basic data delivered in response to the second online request carrying the replacement identifier. Since the basic data of the corresponding layer is replaced only by the replacement identifier, the workload of data processing is small, and the efficiency is high, so that the users may be informed of the map data update in case of emergency intervention at the first time.

Figure 3:
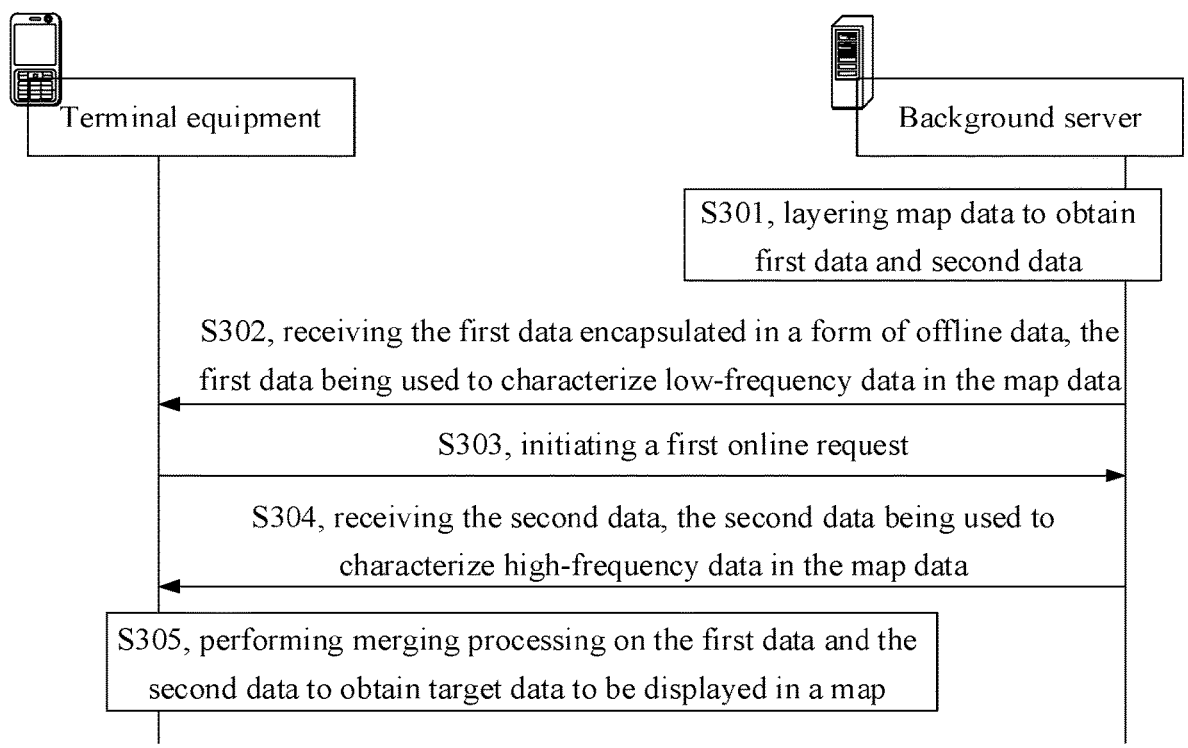
FIG. 3 is a schematic flowchart of a map data processing method according to embodiments of the present disclosure.

A map data processing method is provided according to embodiments of the present disclosure, and FIG. 3 is a schematic flowchart of a map data processing method according to embodiments of the present disclosure. The method includes the followings.

In S301, the background server layers the map data to obtain the first data and the second data.

In S302, the terminal equipment receives the first data encapsulated in the form of offline data, and the first data is used to characterize the low-frequency data in the map data.

In S303, the terminal equipment initiates a first online request to the background server.

In S304, the terminal equipment receives the second data, and the second data is used to characterize the high-frequency data in the map data.

In S305, the terminal equipment performs the merging processing on the first data and the second data to obtain the target data to be displayed in the map.

By adopting embodiments of the present disclosure, the terminal equipment may download data from the background server under the condition of network, and then use the downloaded data offline. Considering the timeliness of the map data, the map data needs to be updated in real time, and the background server may also respond to the first online request to deliver the second data in real time. Finally, the terminal equipment merges the first data and the second data through the map APP to obtain the latest map data and display the latest map data on the map. Since the second data has high timeliness, the obtained map data has high timeliness by integrating with the first data, thereby solving the problem of poor timeliness in the data viewed by users due to the low update frequency of offline map data. Therefore, it is not only convenient and saves traffic, but also the latest map data is displayed in real time in the offline package of the map APP, so that users may obtain the required map data updates at the first time.

Application Example

The map data processing method provided by the above-mentioned implementations of the present disclosure is illustrated below.

In order to obtain the map data update, the geographic information elements need to be displayed and updated in the offline package of the map APP in real time, and it is necessary to ensure the timeliness display of geographic information elements in the offline package (i.e., ensuring the above-mentioned high-frequency data to be updated in real time) and the automatic update of timeliness information (i.e., ensuring the automatic update of the above-mentioned high-frequency data).

First, ensuring the timeliness display of the geographic information elements in the offline package.

There are differences in the update frequency and timeliness requirement of each geographic information element in the map data, for example, the change period of buildings, cities and main roads may be calculated in a unit of decade, the change period of roads and parks may be calculated in a unit of year, and the change period of various stores may be calculated in a unit of month or day. In order to ensure the timeliness display of geographic information elements in the offline package, layering processing may be performed for different geographic information elements according to the update frequencies and timeliness requirements. After layering processing according to the update frequencies of the different geographic information elements, different display strategies are designed for the data with different update frequency, respectively, and thus rapid intervention to the data of each layer may be ensured in an emergency case.

1. The layering processing is performed for different geographic information elements according to the update frequencies and timeliness requirements.

The layering processing may be performed for the different geographic information elements according to the update frequencies and/or the importance. Considering the different geographic information elements, the geographic information elements are divided into two parts, one is POI (i.e., points of interest with icon on the map), and the other is non-POI (i.e., geographic information elements of roads, buildings, rivers, green spaces and the like).

Figure 4:
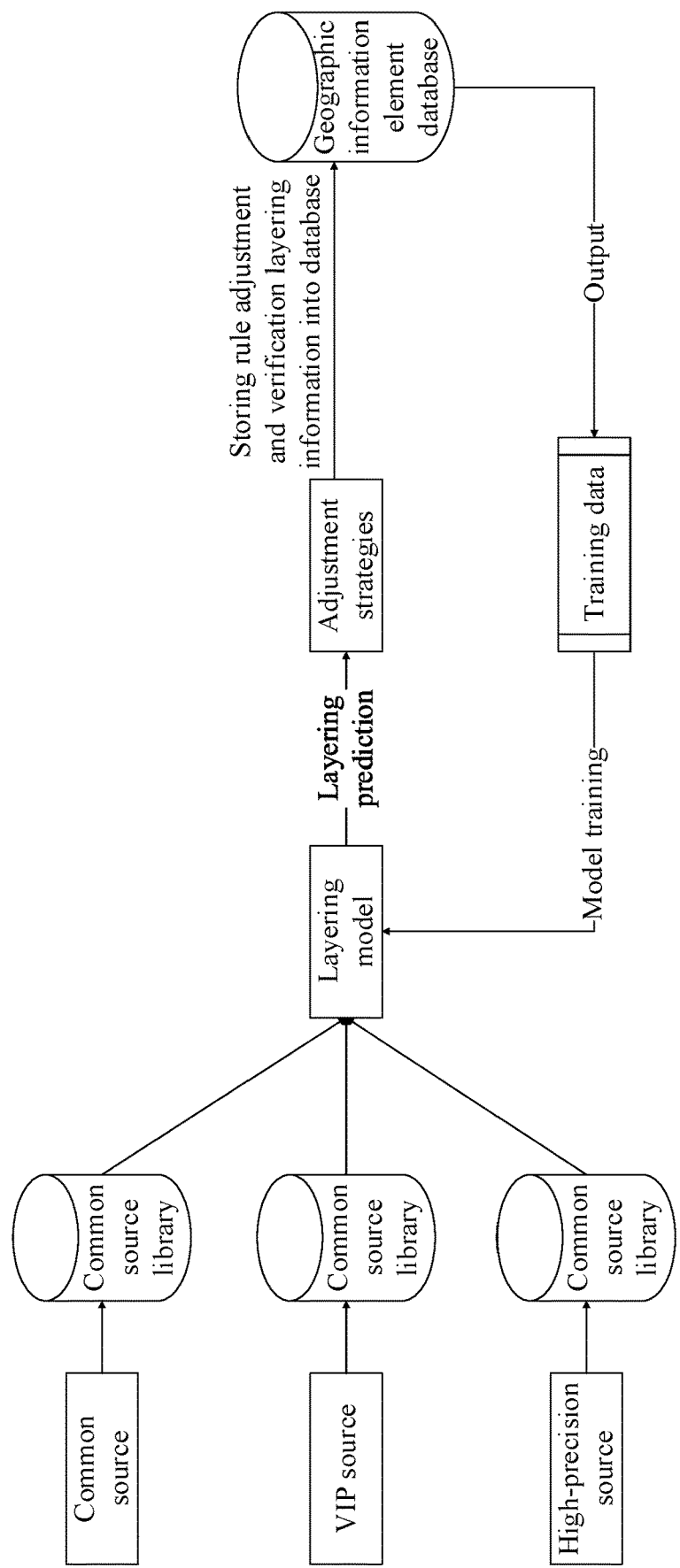
FIG. 4 is a schematic diagram of layering processing applied to an application example of embodiments of the present disclosure.

FIG. 4 is a schematic diagram of layering processing applied to an application example of embodiments of the present disclosure. As illustrated in FIG. 4, prediction of the layering processing may be performed by using the process shown in FIG. 4 for all geographic information elements (i.e., the prediction of the layering processing is performed by the layering model). In an example, the data sources of the above-mentioned POI may be divided into common sources, VIP sources and high-precision sources, the high-precision sources have the highest confidence, the VIP sources have the next highest confidence, the common sources have the lowest confidence, and the sources with a low confidence may not interfere with the data from the sources with a high confidence. The data obtained through these data sources constitute the training data, and the layering model may be trained by the training data.

Common sources, VIP sources and high-precision sources each have corresponding databases, and the data from these sources may be used as training data for the layering model to train the layering model, to predict layering information (for example, the first data is labeled as basic, and the second data is labeled as rich). The predicted data is then verified and adjusted through some manually specified adjustment strategies, and finally the layering information is stored in a geographic information element database (such as POI database). The geographic information element database may not only store the layering information, but also store the shape and other information of geographic information elements, which is a large database with the most complete information. The geographic information element database may calculate and generate training data in a unit of days, to train the layering model.

On the basis of the layering processing performed by the above-mentioned layering model, the layering processing may be further continued based on the drawing attributes of the different geographic information elements and/or the drawing order of the different geographic information elements, in other words, the layering processing may be performed from another dimension. For example, the layering processing may be to divide POI, roads, background surfaces, 3D building models, and the like, and the layering processing is performed according to the drawing attributes of geographic information elements, such as, based on a point-line-surface model. The geographic information elements may be divided into a plurality of large categories through the layering processing, and each large category may be divided into sub-categories. In an example, the large category of "surface" may be divided into sub-categories such as subway surfaces, background surfaces, green surfaces, and the like, to obtain a more detailed hierarchical division. By continuing the layering processing based on the drawing attributes of the different geographic information elements and/or the drawing order of the different geographic information elements, geographic information elements with the same drawing attributes and drawing order may be divided into one geolayer, and an attribute flag_rank is added for each geolayer (used to identify the drawing order of the different geographic information elements). The attribute flag_rank is strongly related to the drawing attribute and the drawing order, and is unique.

Figure 5:
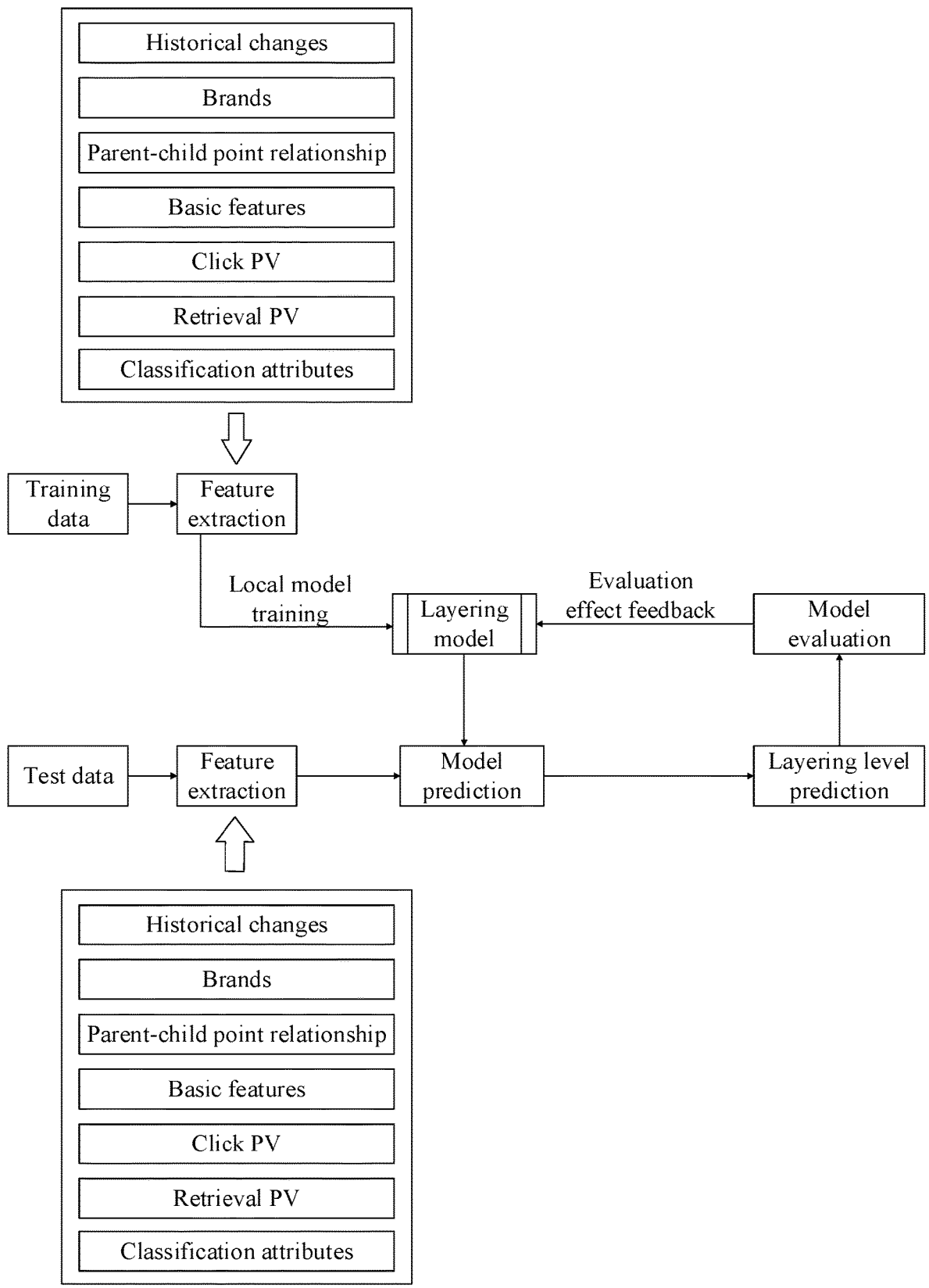
FIG. 5 is a schematic diagram of layering model training applied to an application example of embodiments of the present disclosure.

FIG. 5 is a schematic diagram of layering model training applied to an application example of embodiments of the present disclosure. As illustrated in FIG. 5, the training and evaluating process of the layering model is briefly described, and features are extracted from the training data. The extracted features may include historical changes, brands, parent-child point relationship, basic features, click PV, retrieval PV, classification attributes and the like. After feature extraction, local model training is performed for the layering model, and the above-mentioned layering information predicted by the model is generated through the layering processing of the layering model. In order to test the training effect of the layering model, the layering processing capability of the layering model may be predicted and evaluated through the test data to obtain an effect feedback file, so as to modify the training data according to the effect feedback file.

In an example, the training data and the test data both are extracted from the three types of data sources as illustrated in FIG. 4, and the training of the layering model requires positive samples and negative samples. The positive samples of the training data and the test data are the same each other, and the difference between the training data and the test data lies on their negative samples. For the training data, the data with high pv and less changes may be used as the negative samples, mainly to make the types of the data generated by the layering model through the training data to have diversity. The test data is similar to the online formal data and the negative samples may become very complicated for accuracy, and thus detail descriptions thereof may be omitted herein. Feature extraction is also required for the test data, and similarly, the extracted features may include: historical changes, brands, parent-child point relationship, basic features, click PV, retrieval PV, classification attributes and the like. After feature extraction, model prediction is performed for the layering model to obtain the predicted layering level, and the predicted layering level is compared with the above-mentioned layering information predicted by local model training for the layering model based on the training data (i.e., the model evaluation is performed based on these data to determine whether the training effect of the layering is accurate). After obtaining the effect feedback file, the training data may be modified according to the effect feedback file to continue to train the layering model. In other words, the effect feedback file is also used as an input of the next layering model training to modify the layering model, and the final expectation is obtained that the predicted layering level through the test data and the layering model test model is consistent with the data obtained by training the layering model through the training data, indicating that the layering model training is accurate enough, to obtain more accurate layering information as mentioned above.

2. After performing the layering processing according to the update frequency of the different geographic information elements, different display strategies are designed for data with different update frequencies, respectively. In other words, after performing the layering processing according to the update frequency, different display strategies are designed for high-frequency data and low-frequency data, respectively.

After performing the layering processing, the map data is divided into layering levels of layers 1 to 5, and the layering levels of layers 1 to 5 decrease in importance and increase in update frequency. In an example, the data of layers 1, 2 and 3 are low-frequency data, which is non-POI and accounts for about 85% of all data. The low-frequency data with low update frequency mainly includes geographical information elements of such as buildings, parks, landmark buildings, national roads, high expressways, rivers, green spaces and the like, and the low-frequency data may also be termed as basic data. Since the update frequency is very low and the amount of data is great, which is more suitable for offline storage, the low-frequency data is combined with the offline package and displayed in the map. The data of layers 4 and 5 is high-frequency data, which is non-POI and accounts for about 15% of the total data. The high-frequency data mainly includes POI data with icons appearing on the map, and may also be termed as rich data. Since the update frequency is high, it is more suitable for online distribution to be displayed in the map through real-time updates, and thus the timeliness update of high-frequency data is satisfied, so that the user may obtain the updated map data at the first time.

Figure 6:
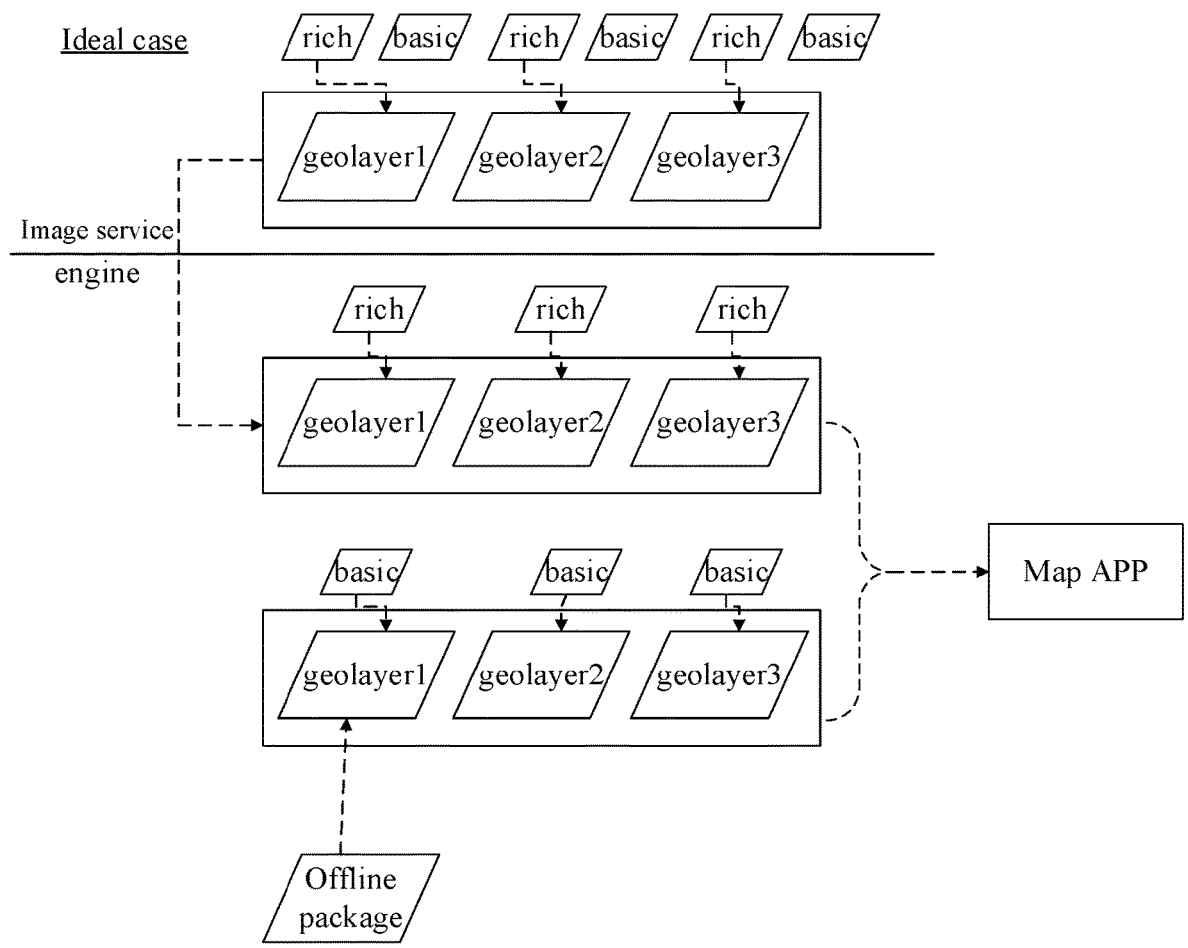
FIG. 6 is a schematic diagram of responding to a first online request in an ideal case applied to an application example of embodiments of the present disclosure.

FIG. 6 is a schematic diagram of responding to a first online request in an ideal case applied to an application example of embodiments of the present disclosure. As illustrated in FIG. 6, in the ideal case, the basic data is not updated and only the rich data needs to be updated in real time. In the case of network, the terminal equipment reads the basic data from the offline package and initiates the first online request to the background server at the same time, to obtain the rich data corresponding to the basic data in the same layer. The terminal equipment performs merging processing on the basic data and the rich data in the same layer through the map APP, and after data of each layer is merged, the map that users may see through the map APP is a map with complete information, and since the real-time update of the rich data, the map has high timeliness.

3. Data for each layer may be ensured for rapid intervention in an emergency case.

Figure 7:
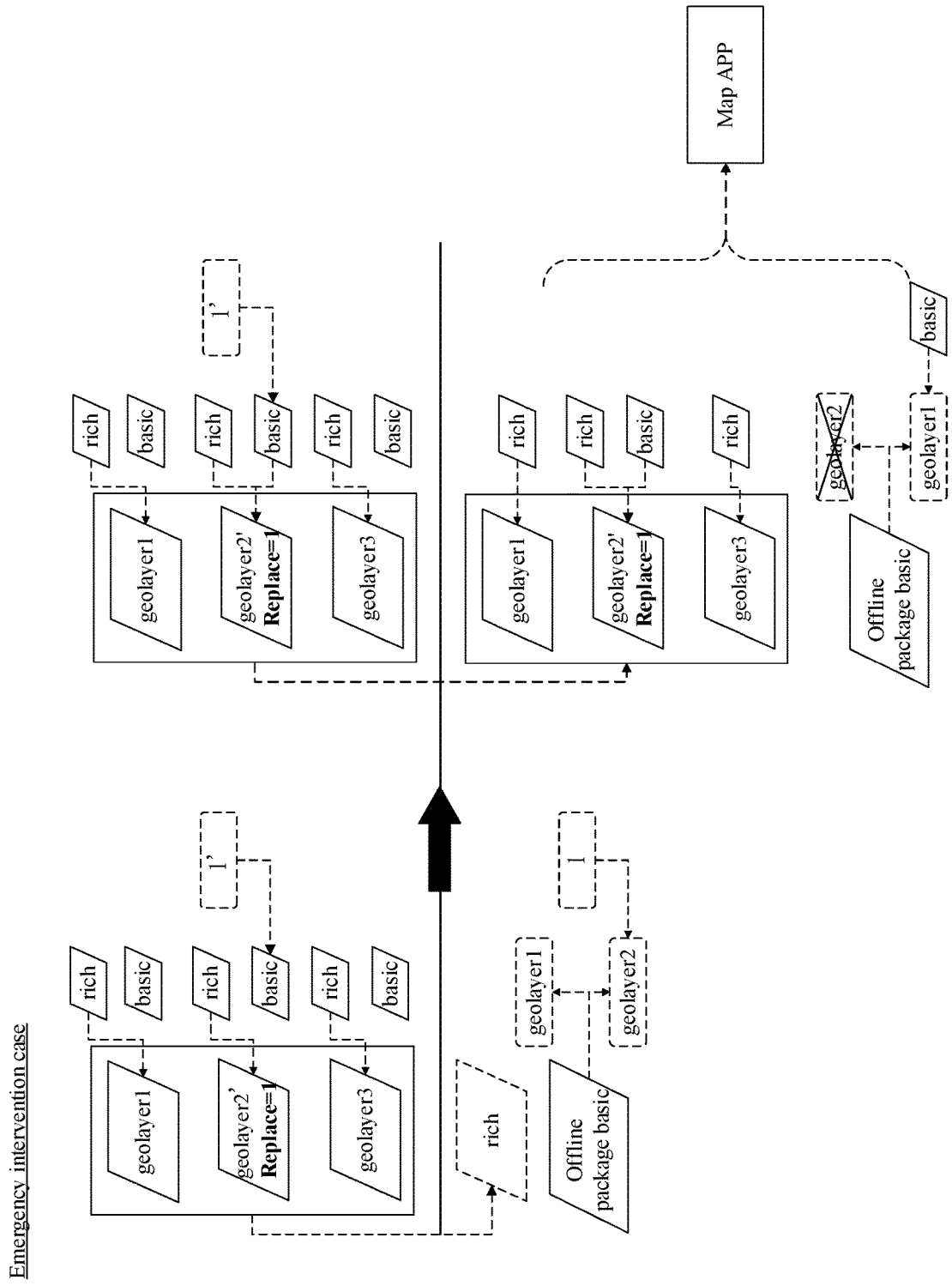
FIG. 7 is a schematic diagram of responding to a second online request in an emergency intervention case applied to an application example of embodiments of the present disclosure.

FIG. 7 is a schematic diagram of responding to a second online request in an emergency intervention case applied to an application example of embodiments of the present disclosure. As illustrated in FIG. 7, in the emergency intervention case, the basic data also needs to be updated, that is, not only the rich data needs to be updated in real time, but also the basic data needs to be updated in real time. When the terminal equipment performs the merging processing, the map is drawn separately for each geolayer. In the emergency intervention case, for example, a certain geographic information element needs to be intervened rapidly, if the geographic information element of a certain layer needs to be modified (e.g., there are changes in the railway station, a new subway line is opened, a provincial road and expressway/expressway need to be changed, and the like), all geolayers are marked with the replacement identifier "replace=1". The online image service engine will simultaneously deliver geolayer data of this layer after receiving the second online request (a conventional update request is the first online request in the ideal case as illustrated in FIG. 6 to obtain the real-time updated rich data, so that the real-time updated rich data is merged with the basic data in the previously downloaded offline package) initiated by the terminal equipment through the map APP, i.e., in response to the second online request in the emergency intervention case, in order to obtain the updated basic data that needs to be modified, the rich data is still required to be updated in real-time, so that the real-time updated rich data and the updated basic data may be merged. After receiving the data with the replacement identifier (replace=1) through the map APP, the terminal equipment will delete the basic data for the same flag_rank attribute in the previous offline package, and use the geolayer of this layer delivered by the online image service engine to draw. That is, the geolayer of this layer delivered by the online image service engine is recorded as geolayer2', and the geolayer of the same layer in the previous offline package is recorded as geolayer2. Since geolayer2' carries the replacement identifier (replace=1), during performing the above merging processing, the original geolayer2 is deleted and geolayer2' is used to draw, to achieve the purpose of emergency intervention.

Second, automatic updating of timeliness information is ensured.

Figure 8:
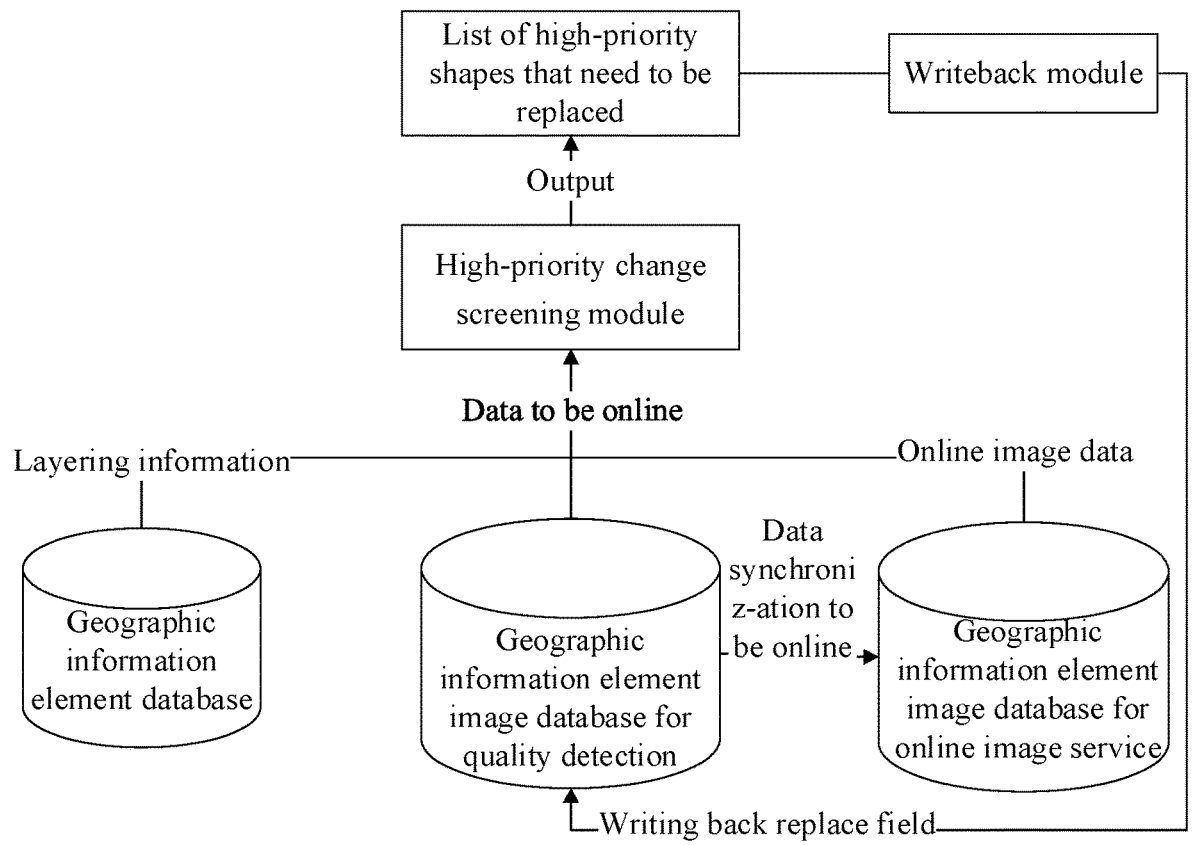
FIG. 8 is a schematic diagram of quality detection screening applied to an application example of embodiments of the present disclosure.

FIG. 8 is a schematic diagram of quality detection screening applied to an application example of embodiments of the present disclosure. As illustrated in FIG. 8, a geographic information element database is used for storing the above-mentioned layering information obtained by the layering model, a geographic information element image database for quality detection is used for storing the data after quality detection (e.g., whether the above-mentioned emergency intervention is required for the data), and a geographic information element image database for online image service is used for performing data synchronization after the quality detection, and has consistent data with the geographic information element image database for quality detection. The data in the geographic information element image database used for the online image service is the data delivered by the above-mentioned online service engine. In an example, the geographic information element database stores all information and is a large database, while the geographic information element image database for quality detection and the geographic information element image database for online image service only store shape information. if the shape information of the above three databases is inconsistent, for example, if there are changes in provincial roads, subways, national roads, expressways/expressways, and the like, it is indicated that data modification requiring emergency intervention has occurred, and the shapes may be compared through a high-priority change screening module to obtain the percentage of shape deformation. If the percentage of the shape deformation exceeds 5%, a list of high-priority shapes that need to be replaced is filtered out, the basic data marked with the replacement identifier (replace=1) will be written back to the geographic information element image database for quality detection through a writeback module, and then the basic data marked with the replacement identifier (replace=1) will be synchronized to the geographic information element image database for online image service.

By adopting the example of the present application, users may use as less traffic as possible (such as, about 15% of the full data size) to improve the timeliness of displaying map data based on offline packages, and thus it is not only convenient and saves traffic, but also users may obtain the real-time updated map data at the first time.

Since the high-frequency data with high timeliness is delivered by online services, the update frequency of offline packages may be reduced twice (i.e., the update may be performed monthly or bimonthly). The extension of offline package update period also means that CDN cost of the map APP is reduced, and thus investment cost is reduced (it is estimated that the CDN cost of offline package may be reduced by more than 20%, and the CDN cost may be saved by one million a year). In an example, CDN is a content distribution network and suitable for accelerated distribution services of any type of content, which is usually billed by traffic or by peak daily bandwidth. By adopting the example of the present application, the investment cost in CDN fees may be significantly reduced, and users may be provided with high timeliness, scalability and low-cost services for map data update.

Figure 9:
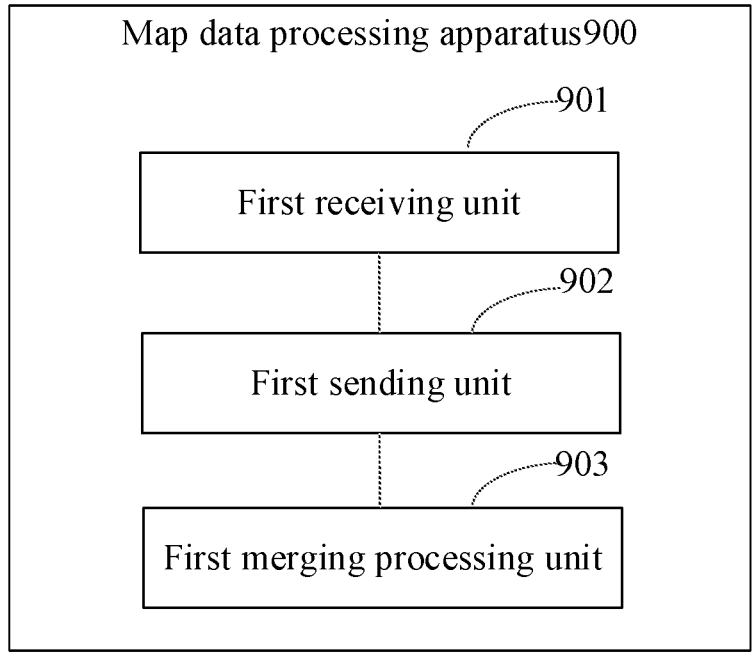
FIG. 9 is a structural diagram of a map data processing apparatus according to embodiments of the present disclosure.

A map data processing apparatus is provided according to embodiments of the present disclosure, and FIG. 9 is a structural diagram of a map data processing apparatus according to embodiments of the present disclosure. As illustrated in FIG. 9, the map data processing apparatus 900 includes: a first receiving unit 901 configured to receive first data encapsulated in the form of offline data, the first data being used to characterize the low-frequency data in the map data, a first sending unit 902 configured to obtain second data after initiating a first online request, the second data being used to characterize the high-frequency data in the map data, and a first merging processing unit 903 configured to perform merging processing on the first data and the second data to obtain the target data to be displayed in the map.

In one exemplary implementation, the first data includes non-POI data, and the second data includes POI data.

In one exemplary implementation, the first merging processing unit is configured to: read, from the first data, a first geographic information element pertaining to a first layer; read, from the second data, a second geographic information element pertaining to the first layer; perform merging processing on the first geographic information element and the second geographic information element in the first layer; and continue to perform the merging processing on geographic information elements belonging to the same layer in the first data and the second data, until data of each layer is merged, to obtain the target data displayed in the map.

In one exemplary implementation, the apparatus further includes a response unit configured to initiate a second online request, in response to an emergency intervention event, and a second receiving unit configured to receive requested updated first data. In an example, the updated first data is indicated by a replacement identifier.

In one exemplary implementation, the first merging processing unit is configured to: read, from the updated first data, a third geographic information element pertaining to a corresponding target layer; replace a first geographic information element pertaining to the corresponding target layer in the first data with the third geographic information element; read, from the second data, a fourth geographic information element pertaining to the target layer; and perform merging processing on the third geographic information element and the fourth geographic information element in the target layer, to obtain the target data to be displayed in the map.

Figure 10:
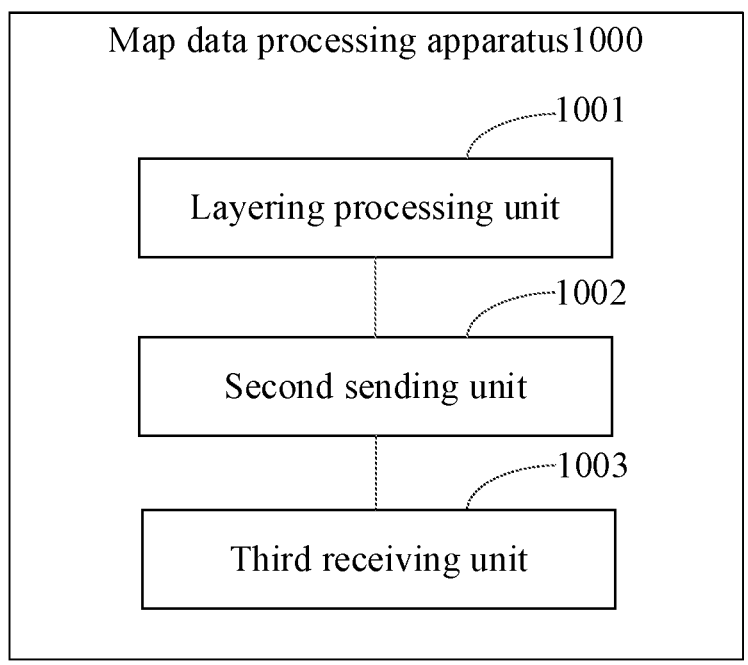
FIG. 10 is a structural diagram of a map data processing apparatus according to embodiments of the present disclosure.

A map data processing apparatus is provided according to embodiments of the present disclosure, and FIG. 10 is a structural diagram of a map data processing apparatus according to embodiments of the present disclosure. As illustrated in FIG. 10, a map data processing apparatus 1000 includes: a layering processing unit 1001 configured to layer the map data to obtain first data and second data, the first data being used to characterize low-frequency data in the map data and the second data being used to characterize high-frequency data in the map data; a second sending unit 1002 configured to send the first data encapsulated in a form of offline data; and a third receiving unit 1003 configured to receive a first online request and send the second data.

In one exemplary implementation, the layering processing unit is configured to layer the map data based on an update frequency of different geographic information elements and/or importance of the different geographic information elements according to a layering model, to obtain the first data and the second data.

In one exemplary implementation, the layering model is obtained by training a model after performing feature extraction on training data, and a data source of the training data includes a plurality of data sources with a different confidence level.

In one exemplary implementation, the apparatus further includes a model evaluation unit configured to predict and evaluate a layering processing capability of the layering model through test data to obtain an effect feedback file, and a data modification unit configured to modify the training data according to the effect feedback file.

In one exemplary implementation, the layering processing unit is configured to layer the map data based on a drawing attribute of different geographic information elements and/or a drawing order of the different geographic information elements.

In one exemplary implementation, the apparatus further includes: a fourth receiving unit configured to receive a second online request, in response to initiating an emergency intervention event, and a third sending unit configured to send requested updated first data. In an example, the updated first data is indicated by a replacement identifier.

The functions of each unit in each apparatus of embodiments of the present disclosure may be referred to the corresponding description in the above method, and detail descriptions thereof may be omitted herein.

In the technical solutions of the present disclosure, acquisition, storage and application of user's personal information involved herein are all in compliance with the provisions of relevant laws and regulations, and do not violate public order and good customs.

According to embodiments of the present disclosure, the present disclosure also provides an electronic device, a readable storage medium and a computer program product.

Figure 11:
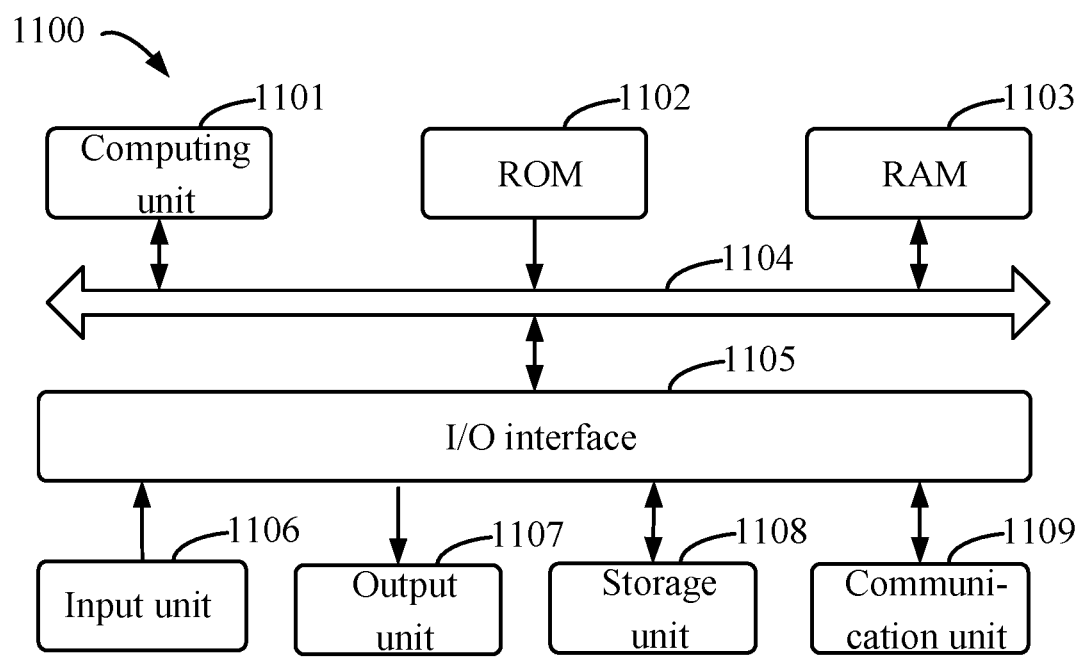
FIG. 11 is a block diagram of an electronic device for implementing a map data processing method according to embodiments of the present disclosure.

FIG. 11 illustrating a schematic block diagram of an electronic device for implementing a map data processing method according to embodiments of the present disclosure. Electronic devices are intended to represent various forms of digital computers, such as laptops, desktops, workstations, personal digital assistants, servers, blade servers, mainframe computers, and other suitable computers. Electronic devices may also represent various forms of mobile devices, such as personal digital processing, cellular phones, smart phones, wearable devices and other similar computing devices. Components shown herein, their connections and relationships as well as their functions are merely examples, and are not intended to limit the implementation of the present disclosure described and/or required herein.

As illustrated in FIG. 11, the electronic device 1100 includes a computing unit 1101 that may perform various appropriate actions and processes according to a computer program stored in a read only memory (ROM) 1102 or a computer program loaded from a storage unit 1108 into a random access memory (RAM) 1103. In RAM 1103, various programs and data required for the operation of the electronic device 1100 may also be stored. The computing unit 1101, ROM 1102 and RAM 1103 are connected each other through bus 1104. The input/output (I/O) interface 1105 is also connected to the bus 1104.

A plurality of components in the electronic device 1100 are connected to the I/O interface 1105, and include an input unit 1106 such as a keyboard, a mouse, and the like, an output unit 1107 such as various types of displays, speakers, and the like, a storage unit 1108 such as a magnetic disk, an optical disk, and the like, and a communication unit 1109 such as a network card, a modem, a wireless communication transceiver, and the like. The communication unit 1109 allows the electronic device 1100 to exchange information/data with other devices through computer networks such as Internet and/or various telecommunication networks.

The computing unit 1101 may be various general-purpose and/or special-purpose processing components with processing and computing capabilities. Some examples of the computing unit 1101 include, but are not limited to, a central processing unit (CPU), a graphics processing unit (GPU), various dedicated artificial intelligence (AI) computing chips, various computing units running machine learning model algorithms, digital signal processors (DSP), and any appropriate processors, controllers, microcontrollers, and the like. The computing unit 1101 performs various methods and processes described above, for example, a map data processing method. For example, in some exemplary implementations, the map data processing method may be implemented as a computer software program, which is tangibly contained in a machine-readable medium, for example, the storage unit 1108. In some exemplary implementations, part or all of the computer program may be loaded and/or installed on the electronic device 1100 via ROM 1102 and/or the communication unit 1109. When the computer program is loaded into RAM 1103 and executed by the computing unit 1101, one or more steps of the map data processing method described above may be performed. Alternatively, in other exemplary implementations, the computing unit 1101 may be configured to perform the map data processing method by any other suitable means (e.g., for example, by means of firmware).

Various implementations of the systems and technologies described above herein may be implemented in a digital electronic circuit system, an integrated circuit system, a field programmable gate array (FPGA), an application specific integrated circuit (ASIC), an application special standard product (ASSP), a system on chip (SOC), a load programmable logic device (CPLD), a computer hardware, firmware, software, and/or a combination thereof. These various implementations may include implementing in one or more computer programs that may be executed and/or interpreted on a programmable system including at least one programmable processor. The programmable processor may be a special-purpose or general-purpose programmable processor, and may receive data and instructions from a storage system, at least one input device, and at least one output device, and transmit data and instructions to the storage system, the at least one input device, and the at least one output device.

The program code for implementing the methods of the present disclosure may be written in any combination of one or more programming languages. These program codes may be provided to the processor or controller of general-purpose computer, special-purpose computer or other programmable data processing device, so that when executed by the processor or controller, the program code enables the functions/operations specified in the flow chart and/or block diagram to be implemented. The program code may be executed completely on a machine, partially on a machine, partially on a machine and partially on a remote machine, or completely on a remote machine or server as a separate software package.

In the context of the present disclosure, a machine-readable medium may be a tangible medium that may contain or store programs for use by or in combination with an instruction execution system, device, or equipment. The machine-readable medium may be machine-readable signal medium or machine-readable storage medium. The machine readable medium may include, but are not limited to, electronic, magnetic, optical, electromagnetic, infrared, or semiconductor systems, devices, or equipment, or any suitable combination of the above. More specific examples of the machine-readable storage medium may include electrical connections based on one or more lines, portable computer disk, hard disk, random access memory (RAM), read only memory (ROM), erasable programmable read only memory (EPROM or flash memory), optical fiber, compact disk read only memory (CD-ROM), optical storage device, magnetic storage device, or any suitable combination of the above.

In order to provide interaction with the user, the systems and technologies described herein may be implemented on a computer. The computer has a display device (e.g., a cathode ray tube (CRT) or a liquid crystal display (LCD) monitor) for displaying information to the user and a keyboard and a pointing device (e.g., a mouse or a trackball) through which the user may provide input to the computer. Other types of devices may also be used to provide interaction with the user. For example, feedback provided to the user may be any form of sensory feedback (e.g., visual feedback, auditory feedback, or tactile feedback), and it is capable of receiving input from the user in any form (including acoustic input, voice input, or tactile input).

The systems and technologies described herein may be implemented in a computing system that includes a back-end component (e.g., as a data server), a computing system that includes a middleware component (e.g., as an application server), a computing system that includes a front-end component (e.g., as a user computer with a graphical user interface or web browser through which the user may interact with the implementation of the systems and technologies described herein), or a computing system that includes any combination of the back-end component, the middleware component, or the front-end component. The components of the system may be connected each other through any form or kind of digital data communication (e.g., a communication network). Examples of the communication network include a local area network (LAN), a wide area network (WAN), and Internet.

A computer system may include a client and a server. The client and the server are generally far away from each other and usually interact through a communication network. The server may also be a server of a distributed system or a server combined with a block chain, and the relationship between the client and the server is generated through computer programs performed on a corresponding computer and having a client-server relationship with each other.

It should be understood that various forms of processes shown above may be used to reorder, add or delete steps. For example, steps described in the present disclosure may be executed in parallel, sequentially, or in a different order, as long as the desired result of the technical solution disclosed in the present disclosure may be achieved, but is not limited herein.

The foregoing specific embodiments do not constitute a limitation to the protection scope of the present disclosure. Those having ordinary skill in the art should understand that various modifications, combinations, sub-combinations and substitutions may be made according to design requirements and other factors. Any modification, equivalent replacement and improvement made within the spirit and principle of the present disclosure should be included in the protection scope of the present disclosure.

What is claimed is:

1. A map data processing method, comprising:
    receiving first data encapsulated in a form of offline data, the first data being used to characterize low-frequency data in map data;
    obtaining second data after initiating a first online request, the second data being used to characterize high-frequency data in the map data; and
    performing merging processing on the first data and the second data, to obtain target data to be displayed in a map;
    wherein the first data and the second data are obtained by a background server by layering the map data based on an update frequency of different geographic information elements and/or importance of the different geographic information elements according to a layering model, the layering model is obtained by training a model after performing feature extraction on training data, and a data source of the training data comprises a plurality of data sources with a different confidence level.

2. The method of claim 1, wherein the first data comprises non-point-of-interest (POI) data, and the second data comprises POI data.

3. The method of claim 1, wherein performing merging processing on the first data and the second data, to obtain the target data to be displayed in the map, comprises:
    reading, from the first data, a first geographic information element pertaining to a first layer;

reading, from the second data, a second geographic information element pertaining to the first layer;
performing merging processing on the first geographic information element and the second geographic information element in the first layer; and
continuing to perform merging processing on geographic information elements belonging to a same layer in the first data and the second data, until data of each layer is merged, to obtain the target data to be displayed in the map.

4. The method of claim 1, further comprising:
initiating a second online request, in response to an emergency intervention event; and
receiving requested updated first data, the updated first data being indicated by a replacement identifier.

5. The method of claim 4, wherein performing merging processing on the first data and the second data, to obtain the target data to be displayed in the map, comprises:
reading, from the updated first data, a third geographic information element pertaining to a corresponding target layer;
replacing a first geographic information element pertaining to the corresponding target layer in the first data with the third geographic information element;
reading, from the second data, a fourth geographic information element pertaining to the target layer; and
performing merging processing on the third geographic information element and the fourth geographic information element in the target layer, to obtain the target data to be displayed in the map.

6. A map data processing method, comprising:
layering map data, to obtain first data and second data, comprising:
layering the map data based on an update frequency of different geographic information elements and/or importance of the different geographic information elements, according to a layering model, to obtain the first data and the second data;
wherein the layering model is obtained by training a model after performing feature extraction on training data, and a data source of the training data comprises a plurality of data sources with a different confidence level;
wherein the first data is used to characterize low-frequency data in the map data, and the second data is used to characterize high-frequency data in the map data;
sending the first data encapsulated in a form of offline data; and
sending the second data, in response to receiving a first online request.

7. The method of claim 6, further comprising:
predicting and evaluating a layering processing capability of the layering model through test data, to obtain an effect feedback file; and
modifying the training data according to the effect feedback file.

8. The method of claim 6, further comprising:
layering the map data, based on a drawing attribute of different geographic information elements and/or a drawing order of the different geographic information elements.

9. The method of claim 6, further comprising:
receiving a second online request, in response to initiating an emergency intervention event; and
sending requested updated first data, the updated first data being indicated by a replacement identifier.

10. An electronic device, comprising:
at least one processor; and
a memory connected in communication with the at least one processor,
wherein the memory stores instructions executable by the at least one processor, and the instructions are executed by the at least one processor to enable the at least one processor to execute the method of claim 1.

11. The electronic device of claim 10, wherein the first data comprises non-point-of-interest (POI) data, and the second data comprises POI data.

12. The electronic device of claim 10, wherein the instructions are executed by the at least one processor to enable the at least one processor to further execute:
reading, from the first data, a first geographic information element pertaining to a first layer;
reading, from the second data, a second geographic information element pertaining to the first layer;
performing merging processing on the first geographic information element and the second geographic information element in the first layer; and
continuing to perform merging processing on geographic information elements belonging to a same layer in the first data and the second data, until data of each layer is merged, to obtain the target data to be displayed in the map.

13. An electronic device, comprising:
at least one processor; and
a memory connected in communication with the at least one processor,
wherein the memory stores instructions executable by the at least one processor, and the instructions are executed by the at least one processor to enable the at least one processor to execute the method of claim 6.

14. The electronic device of claim 13, wherein the instructions are executed by the at least one processor to enable the at least one processor to further execute:
predicting and evaluating a layering processing capability of the layering model through test data, to obtain an effect feedback file; and
modifying the training data according to the effect feedback file.

15. A non-transitory computer-readable storage medium storing computer instructions thereon, wherein the computer instructions are used to enable a computer to execute the method of claim 1.

16. A non-transitory computer-readable storage medium storing computer instructions thereon, wherein the computer instructions are used to enable a computer to execute the method of claim 6.

* * * * *